Figure 1:
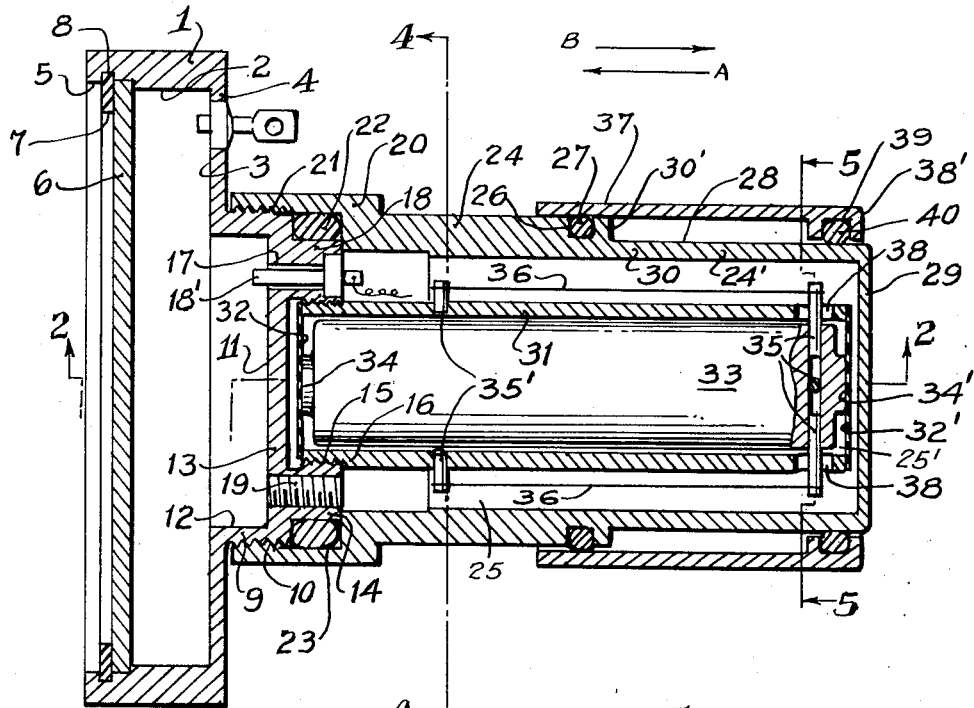

Sept. 25, 1956

L. D. STATHAM 2,764,658

ELECTRIC ACCELEROMETER

Filed Oct. 15, 1953

2 Sheets-Sheet 1

INVENTOR
LOUIS D. STATHAM
BY
ATTORNEY.

Sept. 25, 1956 L. D. STATHAM 2,764,658
ELECTRIC ACCELEROMETER
Filed Oct. 15, 1953 2 Sheets-Sheet 2

INVENTOR
LOUIS D. STATHAM
BY Philip Subkow
ATTORNEY.

United States Patent Office 2,764,658
Patented Sept. 25, 1956

2,764,658
ELECTRIC ACCELEROMETER

Louis D. Statham, Beverly Hills, Calif., assignor to Statham Laboratories, Inc., Los Angeles, Calif., a corporation of California Application October 15, 1953, Serial No. 386,316

6 Claims. (Cl. 201—63)

This invention relates principally to means for providing for expansion of damping fluid employed in transducers or other instruments. Although illustrated in the drawings as applied to an accelerometer of the strain gage type, it may be used in other instruments as stated above.

One object of my invention is to provide a simple means of providing an expansion and contraction and pressure compensating chamber for the oil content of a transducer when the temperature of the oil content varies, thus changing the pressure within the device.

The expansion chamber is illustrated as applied to a strain wire accelerometer for purposes of illustrating the invention, but, as will be understood by those skilled in the art, it may be applied to other types of strain gage instruments and to transducers generally of other types or to any device which is damped by liquid such as oil or which is fluid-filled for like or other purposes.

For the purpose of describing my invention in the form of a specific embodiment, I have chosen for illustrative purposes a particular device, to wit, a strain wire linear accelerometer. This illustration is given not as a limitation, but as an explanation of my invention and to illustrate a preferred form of the expansion chamber which is further described and claimed herein.

Figure 2:
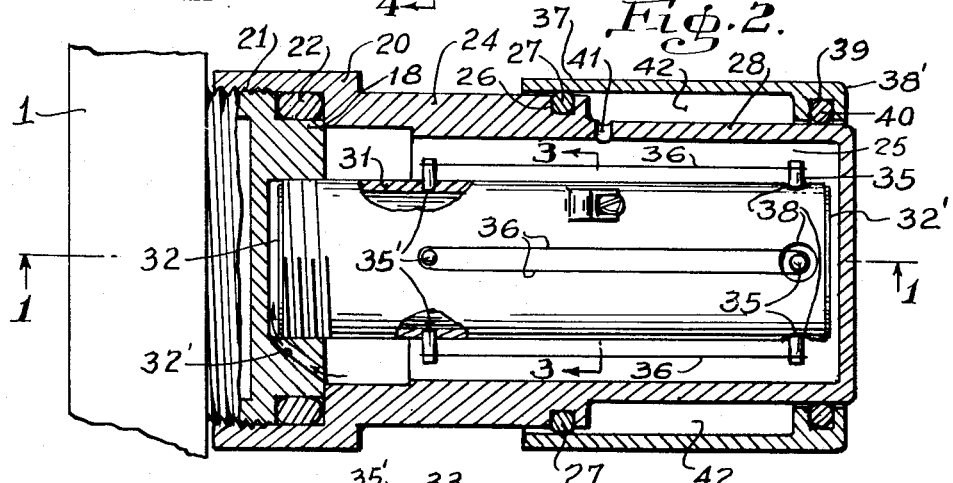
Figure 3:
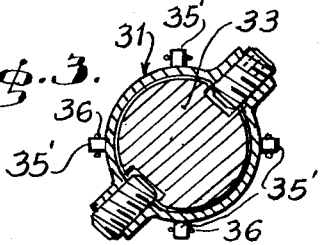
Figure 4:
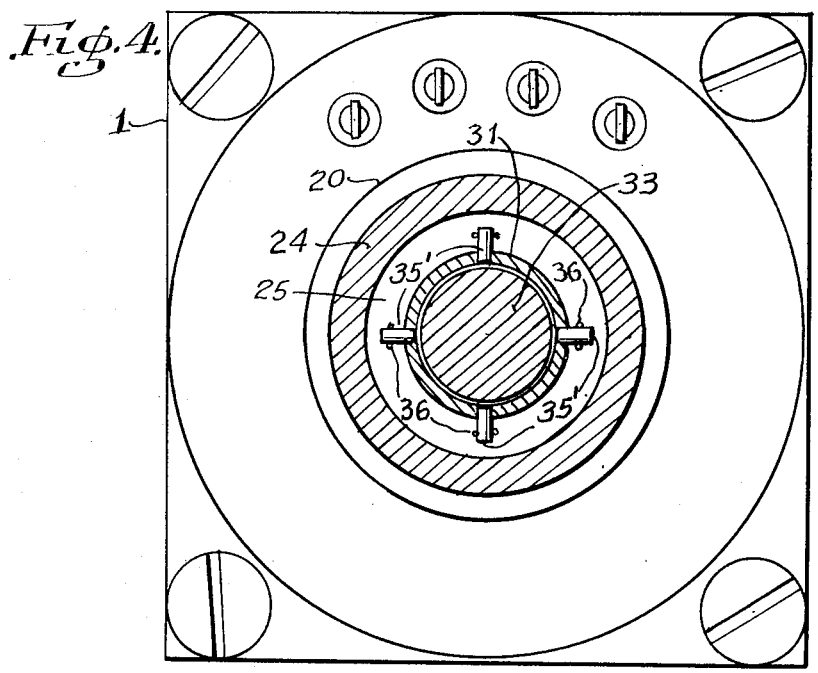
Figure 5:
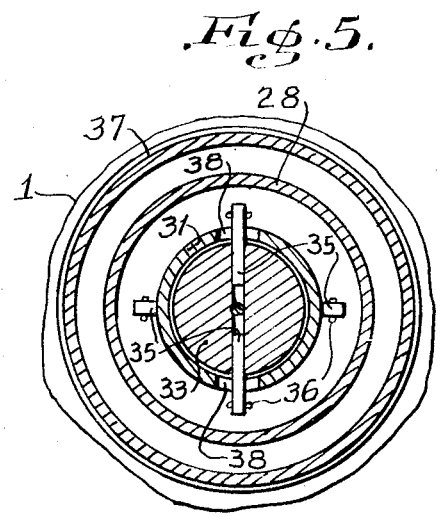

This invention will be more fully described in connection with the drawings, in which Fig. 1 is a vertical section throught he device;
Fig. 2 is a section taken on line 2—2 of Fig. 1;
Fig. 3 is a section taken on line 3—3 of Fig. 2;
Fig. 4 is a section taken on line 4—4 of Fig. 1; and
Fig. 5 is a section taken on line 5—5 of Fig. 1.

The strain wire accelerometer to which the expansion chamber is applied, as illustrated in the drawings, comprises a base 1 (see Figs. 1, 2, and 4, inc.) which is bored at 2 to the depth of the face 3 of the flange 4, and counterbored at 5 into which is fitted the disk 6 retained in place by the snap ring 7 in the groove 8.

Extending from the flange portion 4 of the base 1 the cylindrical hub 9 is provided on its outer diameter with the thread 10, and at face 11 of the counterbore 12 with the wall 13. Projecting from the wall 13 and integral therewith is the projecting hub 14 which is of a lesser diameter than the hub 9. The hub 14 is counterbored and internally threaded at 15 into which is inserted the threaded end 16 of the tubular member 31 which will be more fully described below.

The solid portion of the hub 14 is drilled at 17 to receive and be sealed by the terminal plug 18' to hold the four terminals 18' to which the strain wires are connected, and drilled and tapped at 19 for a close-off plug.

Onto the threaded portion 10 of the hub 9 is fitted the outer cylinder housing 20 constituting, with the end closures to be further described, the circumambient wall of the chamber housing the accelerometer or other device, if another is used. The internal thread 21 mates with the thread 10 on the hub 9. On the outer wall of the hub 18, integral with the hub 9, is mounted an O ring 22 enclosed in the counterbore 23 of the outer cylindrical housing 20. Beyond the counterbore 23 the outer housing 20 is reduced on its outside diameter, i. e., it is stepped to form an exterior shoulder 30' intermediate the ends of the wall 30 to form one portion 24' of smaller outer diameter than the outer portion 24, and adjacent the outer end of this portion the cylindrical wall 25 is grooved at 26 to receive the O ring 27.

Adjacent the O ring groove 26 the outer surface of the cylindrical housing 20 is again reduced in diameter at 28 and continues at this diameter until it reaches the outer end wall 29 which forms the end closure for the internal bore 30 of the housing 20. The tubular member 31 is threaded at the inner end to mate with the internal thread 15 of the hub 18 and both ends of this tube are closed by the flexible diaphragms 32 and 32'. The cylindrical member 31 is housed within the bore 30 and between the outer end wall 29 and the inner wall 13 of the hub 9.

The solid core piece 33 is centrally located within the tubular member 31. It is centrally secured at the inner end 34 to the diaphragm 32 and at the outer end 34' to the diaphragm 32'. Both diaphragms are spaced away from the adjacent walls 13 and 29.

The pins 35 which extend through the openings 38 in the tube 31 are mounted on the core 33 adjacent the outer end 34'. These pins support one end of the electrical resistance strain wires 36 stretched under tension between the supporting pins 35 and the strain wire support pins 35' which are made fast in the tube 31 adjacent the inner end of the tube 31.

The cylindrical open ended sleeve 37 is provided at the outer end with an inwardly flanged end 38' having a smaller internal diameter than the bore of the sleeve 37 and carrying an internal groove 39 in which is inserted the O ring 40 in contact with the outer surface 28 of the housing 20. The sleeve depends over the exterior wall of 24 beyond the shoulder.

The cylindrical wall 28 is provided with port 41 (see Fig. 2) which opens into the interior of the housing 20. The other end of the sleeve 37 is slidably fitted over the outer cylindrical surface of 24. The O rings 27 and 40 thus form a sealed chamber between the walls 37 and 28.

The unit is filled with oil or other damping fluid by removing the plate 6 and the plug 19 and introducing the fluid through the opening 19 preferably under vacuum as is conventional in filling instruments with damping fluid. The oil passes through the hole 19 into the space 25 between the outside of the tube 31 and the inside of the cylindrical housing 20. It also passes through the bores 38 into the space 25' and via the bore 32' to the underneath side of the diaphragm 32. It also passes via the port 41 into the oil expansion chamber 42. Thus all parts of the interior of the unit are filled with oil, all of the air having been displaced by the oil.

When the temperature surrounding the device rises, changing the temperature of the oil contained in the interior of the transducer and the expansion chamber, the oil by the change in temperature either expands or contracts. When the oil contracts this causes the compensator shell 37, provided with the O rings 27 and 40 to prevent any leaks, to move inwardly in the direction of the arrow A, and when the oil expands through a rise in temperature, it moves outwardly in the direction of the arrow B. When the oil expands due to a rise in temperature, the pressure of the oil within the unit is maintained at a constant degree by the compensating device as described above.

While I have described a particular embodiment of my invention for the purpose of illustration, it should be understood that various modifications and adapta-

I claim:

1. An expansible damping fluid container, comprising a chamber containing such damping fluid, a closed container including an outer circumambient wall, an outer sleeve for said container slidably positioned over said outer wall and spaced therefrom forming said damping fluid chamber, a closure at one end of said sleeve, a closure adjacent the other end of said sleeve, there being a passageway in said wall between the exterior of said wall and the interior of said container, and a seal between said sleeve and said outer wall, and a transducer mounted in said container.

2. An expansible damping fluid container, comprising a chamber containing such damping fluid, a closed container including an outer circumambient wall, an outer sleeve for said container slidably positioned over said outer wall and spaced therefrom forming said damping fluid chamber, a closure at one end of said sleeve, a closure adjacent the other end of said sleeve, there being a passageway in said wall between the exterior of said wall and the interior of said container, and a pair of spaced seals between said wall and said sleeve, and a transducer mounted in said container.

3. An expansible damping fluid container, comprising a chamber containing such damping fluid, a closed container including an outer circumambient wall, an outer sleeve for said container slidably positioned over said outer wall and spaced therefrom forming said damping fluid chamber, a closure at one end of said sleeve, a closure adjacent the other end of said sleeve, there being a passageway in said wall between the exterior of said wall and the interior of said container, an O ring seal between said sleeve and said wall adjacent one of said closures, and a second O ring seal between said sleeve and said wall adjacent the other of said closures, and a transducer mounted in said container.

4. In combination, a closed container including an outer circumambient wall, an outer sleeve for said container slidably positioned over said outer wall and spaced therefrom forming a damping fluid chamber, damping fluid in said chamber, a closure at one end of said sleeve, a closure adjacent the other end of said sleeve, there being a passageway in said wall between the exterior of said wall and the interior of said container, a seal between said sleeve and said outer wall, a diaphragm mounted in said container closely adjacent one side thereof and forming a second chamber between said diaphragm and said one side, and means providing a passage from the interior of said container to said second chamber.

5. An expansible damping fluid container, comprising a chamber containing such damping fluid, a closed container including an outer circumambient wall, an outer sleeve for said container slidably positioned over said outer wall and spaced therefrom forming said damping fluid chamber, said sleeve being open at its opposite ends, a closure between said sleeve and said outer wall at one end of said sleeve, a closure between said sleeve and said wall adjacent the other end of said sleeve, means forming a passageway in said wall between the exterior of said wall and the interior of said container, an O ring seal between said sleeve and said wall adjacent one of said closures, and a second O ring seal between said sleeve and said wall adjacent the other of said closures.

6. In combination, a closed container including an outer circumambient wall, an outer sleeve for said container slidably positioned over said outer wall and spaced therefrom forming a damping fluid chamber, damping fluid in said chamber, said sleeve being open at its opposite ends, a closure between said sleeve and said outer wall at one end of said sleeve, a closure between said sleeve and said wall adjacent the other end of said sleeve, means forming a passageway in said wall between the exterior of said wall and the interior of said container, an O ring seal between said sleeve and said wall adjacent one of said closures, and a second O ring seal between said sleeve and said wall adjacent the other of said closures, a diaphragm mounted in said container closely adjacent one side thereof and forming a second chamber between said diaphragm and said one side, and means providing a passage from the interior of said container to said second chamber.

References Cited in the file of this patent

UNITED STATES PATENTS

| | | |
|---|---|---|
| 2,317,028 | Chappell | Apr. 20, 1943 |
| 2,422,031 | Merten | June 10, 1947 |
| 2,440,605 | Hathaway | Apr. 27, 1948 |
| 2,450,608 | Page | Oct. 5, 1948 |